No. 795,808. PATENTED AUG. 1, 1905.
A. ARMITAGE & W. P. THISTLETHWAITE.
CLUTCH CONTROLLING MECHANISM.
APPLICATION FILED DEC. 29, 1904.
2 SHEETS—SHEET 2.
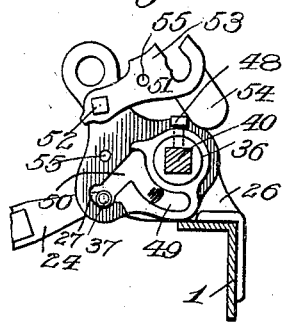
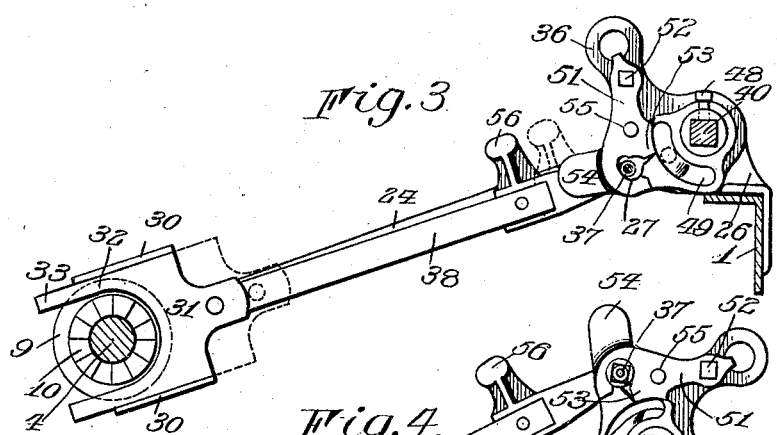
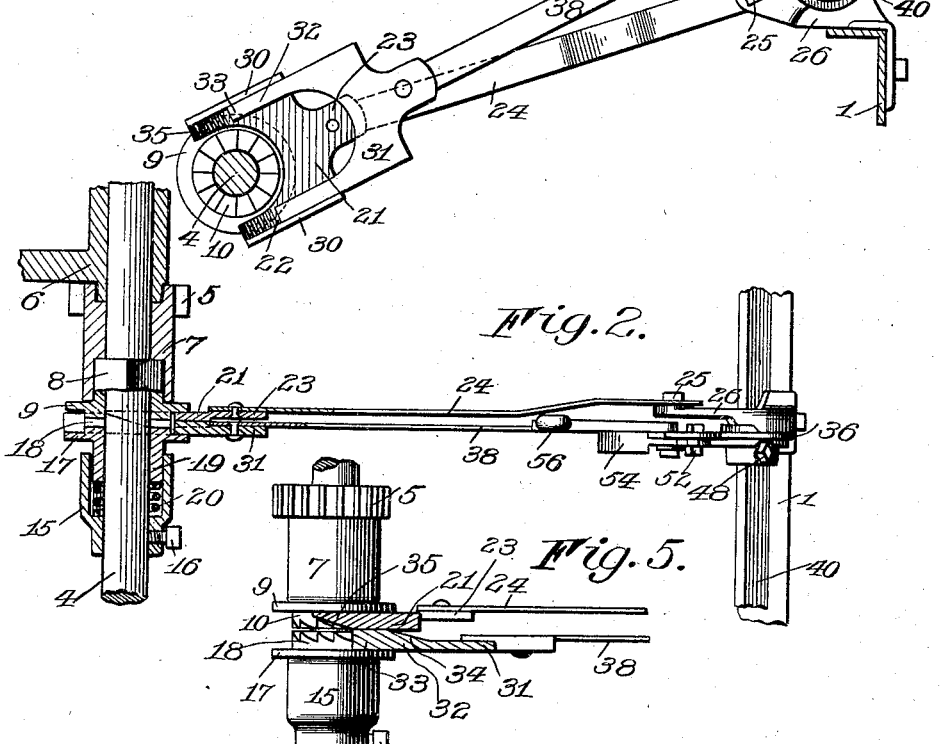
Witnesses.
Walter B. Payne.
G. Willard Rich.
Inventors
Albert Armitage
William P. Thistlethwaite
by
Attorney

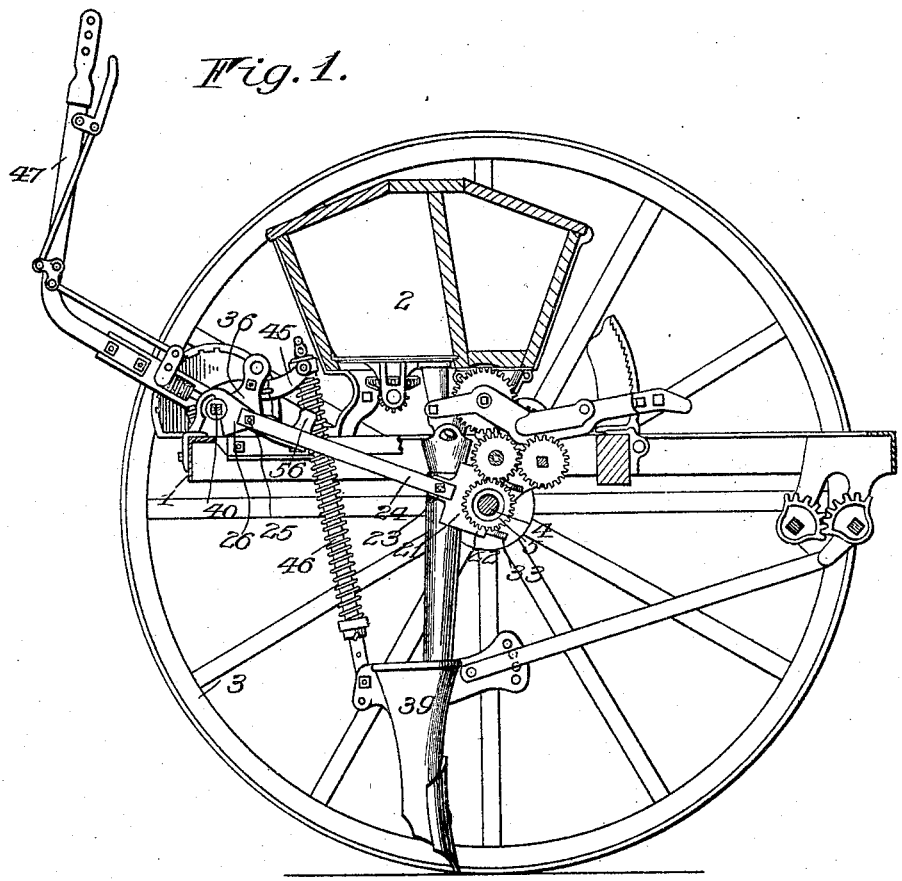

UNITED STATES PATENT OFFICE.

ALBERT ARMITAGE, OF FAIRPORT, AND WILLIAM P. THISTLETHWAITE, OF MACEDON, NEW YORK, ASSIGNORS TO ONTARIO DRILL COMPANY, OF DESPATCH, NEW YORK, A CORPORATION OF NEW YORK.

CLUTCH-CONTROLLING MECHANISM.

No. 795,808.     Specification of Letters Patent.     Patented Aug. 1, 1905.

Application filed December 29, 1904. Serial No. 238,847.

*To all whom it may concern:*

Be it known that we, ALBERT ARMITAGE, of Fairport, in the county of Monroe, and WILLIAM P. THISTLETHWAITE, of Macedon, in the county of Wayne, State of New York, have invented certain new and useful Improvements in Clutch-Controlling Mechanism; and we do hereby declare the following to be a full, clear, and exact description of the same, reference being had to the accompanying drawings, forming a part of this specification, and to the reference-numerals marked thereon.

Our present invention relates to clutch-controlling mechanisms; and it has for its object to provide a simple and economical arrangement of devices for separating the driving and driven members of a clutch mechanism.

To these and other ends our invention consists of certain improvements and combinations of parts, all as will be hereinafter fully set forth, the novel features being pointed out in the claims at the end of this specification.

In the drawings, Figure 1 is a longitudinal sectional view of an agricultural implement, illustrating the application thereto of a clutch-controlling mechanism embodying our invention. Fig. 2 is a top plan view of the clutch-controlling mechanism, portions thereof being shown in section to more clearly illustrate their construction. Fig. 3 is an enlarged side elevation of said devices, showing the parts in their normal or unoperated position. Fig. 4 is a similar view of the parts, showing them in the operated position. Fig. 5 is a detail plan view showing the clutch members disengaged, and Fig. 6 is a detail view of the oscillating member or head.

Similar reference-numerals in the several figures indicate similar parts.

The clutch devices or mechanisms which we have shown are adapted for controlling the engagement and disengagement of the driving and driven members of a clutch, and while they may be employed wherever they may be found useful they are adapted particularly for controlling the connection between the driving-axle of a grain-drill and the parts operated thereby. In Fig. 1 we have illustrated such an implement having a frame 1, supported upon wheels 3, connected to the shaft or axle 4 to cause a continuous rotation thereof in one direction during the forward movement of the vehicle in the usual manner common to this class of implements. The driven member, such as a pinion 5, journaled loosely on the shaft or axle and held from lateral movement thereon by a collar 6, is provided at one side with a laterally-extending hub 7, having a recessed end in which fits an angular projection 8 on a plate 9, provided on its outer face with ratchet-teeth 10. The coöperating driving member is movable laterally relatively to the driven member and comprises a cap 15, secured rigidly to the shaft 4 by a set-screw 16, and a movable plate 17, having ratchet-teeth 18 thereon, which is secured to the cap by a hub 19, angular in cross-section, fitting within a similarly-shaped aperture in the cup and normally operated outwardly therein by a spring 20 to cause the ratchet-teeth 18 to engage with the teeth 10, whereby a rotary motion of the shaft may be imparted to the driven member or pinion 5. The clutch-controlling devices consist generally of a bearing member and a relatively movable member or shoe coöperating therewith, together with devices for actuating it to cause the disengagement of the clutch members. In the present illustration we have shown the bearing member as composed of a plate 21, which is bifurcated, forming the arms 22, extending between the plates 9 and 17. At its rear side the plate is provided with a lug or short extension 23, to which is pivotally connected an arm or stay-rod 24, which is also pivotally connected by a bolt 25 to a bracket 26, rigidly attached to the rear bar of the frame 1. At the upper and lower edges of the bearing member 21 are laterally-extending ribs 30, and between these is guided the relatively movable separating member or shoe 31, provided with the ends 32, having their extremities 33 increased in thickness and connected by inclined surfaces 34 with the thinner body portion of the member. It will be noticed that the ends 32 are somewhat longer than the corresponding ends of the plate 21, so that when the parts are in the position shown in Fig. 3 the enlarged or wedge-shaped ends 33 extend beyond the ends of the arms 22, while the beveled portions of their faces rest against corresponding camsurfaces 35 on the bearing member, thus facilitating the movement of the separating member when it is adjusted to draw its wedge-shaped ends between the edges of the plate 17 and the bearing member to force the laterally-movable clutch member out of engagement with its coöperating part and to disengage the clutch-teeth 10 and 18.

The devices for operating the separating member consist of a head 36, journaled on the bracket 26 and provided with a bearing-aperture 27, in which is received a journal-pin 37 on the end of an operating-arm 38, rigidly connected to the member 31, said head forming a crank which may be operated by any suitable device to project the arm 38, as shown in Fig. 3, or to retract it, as shown in Fig. 4, to respectively connect or disconnect the clutch members. The movement of the head 36 about its pivotal point on the bracket 26 causes the member 31 to rotate slightly about the shaft 4; but as it is guided on the bearing-plate 21 and the latter may tilt freely by reason of the pivotal connections at the ends of the supporting-arm 24 there is no binding of the parts.

For convenience in operation and also to obtain a conjoint operation between the devices for controlling the clutch members and other mechanism mounted upon and actuated by the same shaft, whereby the former may be disconnected, the head 36 is rigidly secured to the shaft 40 by means of a set-screw 48. However, it may be desirable to disconnect the clutch members without operating such other devices, and, further, to permit the latter to be operated without affecting the clutch members. To this end the head 36 is provided with a bearing-slot 49, which is formed concentric to the center of movement of the head and within the arc described by the recess or bearing-aperture 27, and it is connected at one end with the bearing-aperture 27 by means of a channel 50, which is normally closed by a gate 51, pivoted at 52, having a lip 53, adapted to form a portion of the concentric slot 49 when it is closed. The gate is provided at its outer end with an enlarged projection 54, forming a weight which normally holds it in the closed position; but, if desired, it may be securely fastened by passing a bolt or pin through an aperture 55 therein, as will be understood. When the parts are in certain positions of adjustment, if the operator desires to move the journal-pin 37 into the slot 49 it will be necessary to move the rod 38 rearwardly, and to facilitate this operation I provide it with a small knob or handle 56.

From the foregoing it will be seen that when the clutch-controlling mechanism is applied to a grain-drill, for instance, or similar implement and the journal-pin 37 is secured in the aperture 27 the clutch members will be disconnected whenever the shaft 40 is rotated to operate other devices actuated thereby. If it is necessary to disconnect the clutch members and at the same time operate such other devices, the operator may open the gate 51 and, by drawing the rod 38 rearwardly, pass the journal-pin 37 thereon through the channel 50 into the concentric aperture 49, in which it will be retained by the gate when the latter is returned to its normal position.

The controlling devices shown and described are simple and embody few parts, which may be easily assembled without requiring accurate fitting.

We claim as our invention—

1. In a clutch, the combination with a driving and a driven member, one of which is movable relatively to the other, of a bearing member and a shoe coöperating therewith and arranged between the clutch members and means for moving the shoe longitudinally and laterally relatively to the bearing member.

2. In a clutch, the combination with a driving and a driven member, one of which is movable relatively to the other, shoes arranged between them, one of which is provided with an inclined face and means for moving said shoe longitudinally on the other.

3. The combination with relatively movable driving and driven clutch members, of a bearing member arranged between the clutch members, a separating member coöperating with the bearing member and one of the clutch members and means for moving it into the operative and inoperative positions.

4. The combination with the driving and driven clutch members one of which is movable relatively to the other and a bearing member arranged between them, of a wedge coöperating with the bearing member and engaging the movable clutch member and means for operating said wedge to connect and disconnect the clutch members.

5. The combination with driving and driven clutch members one of which is movable relatively to the other and a bearing member arranged between them, of a separating member coöperating with the bearing member and one of the clutch members to disconnect them, an oscillatory head, means for operating it and connections between the head and the separating member.

6. The combination with a driving member and a laterally-movable driven clutch member, of a separating member arranged between them and an oscillatory head, means for operating it, an arm attached to the separating member and connected to the head and means for adjusting the connection between said head and arm.

7. The combination with a driving member and a laterally-movable driven clutch member, of a separating member arranged between them and an oscillatory head, means for operating it, an arm attached to the separating member and means for connecting it to the head at various points relatively to its center of movement.

8. The combination with a driving member and a laterally-movable driven clutch member, of a separating member arranged between them and an oscillatory head, having a concentric recess and bearing-recess, an arm attached to the separating member adapted to be secured in either recess and means for operating the head.

9. The combination with a driving member and a laterally-movable driven clutch member, of a separating member arranged between them and an oscillatory head, having a concentric recess and a bearing-recess arranged outside of the latter and connected thereto and an arm on the separating member, a journal thereon coöperating with said recesses and means for operating the head.

10. The combination with a driving member and a laterally-movable driven clutch member, of a separating member arranged between them and an oscillatory head, having a concentric recess and a bearing-recess arranged outside of the latter and connected thereto by a channel, a gate for closing the latter and an arm on the separating member, a journal thereon coöperating with said recesses in the head and means for operating the latter.

11. The combination with a driving member, a laterally-movable driven clutch member, and a separating device arranged between them having an operating-arm, of an oscillatory head provided with an aperture, a circular recess and a channel connecting the aperture and recess, a journal on the arm coöperating with said parts, a gate normally closing the channel and means for operating the head.

12. The combination with a driving and a driven clutch member one of which is movable relatively to the other, a bearing member and means for pivotally supporting it, of a separating device guided on the bearing member and coöperating with one of the clutch members, a crank connected to the separating member and means for operating it.

13. The combination with a driving and a driven clutch member one of which is movable relatively to the other, a bearing member arranged between the clutch members and a relatively stationary support located in proximity thereto, of an arm attached to the support and pivotally connected to the bearing member, a separating device guided on the latter and coöperating with one of the clutch members, a crank journaled on the support and connected to said device and means for operating the crank.

14. The combination with a driving and a driven clutch member one of which is movable relatively to the other, a bearing member arranged between the clutch members and a relatively stationary support located in proximity thereto, of a bracket on the support, an arm connecting the bracket and bearing member and a separating device engaging the latter and one of the clutch members, a crank journaled on the bracket, an arm joining it to said device and means for operating the crank.

ALBERT ARMITAGE.
WILLIAM P. THISTLETHWAITE.

Witnesses:
 EMORY D. LAPHAM,
 GEORGE W. STEVENS.